United States Patent
Perisho et al.

(10) Patent No.: US 9,438,089 B2
(45) Date of Patent: Sep. 6, 2016

(54) SYSTEMS AND METHODS FOR PREVENTING ROTATION OF ROTOR BEARINGS IN A STATOR

(71) Applicant: Baker Hughes Incorporated, Houston, TX (US)

(72) Inventors: Randal Perisho, Jenks, OK (US); John M. Knapp, Claremore, OK (US); Andrew J. Brasher, Owasso, OK (US); Johney W. Stephens, Collinsville, OK (US); Sean A. Cain, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/199,524

(22) Filed: Mar. 6, 2014

(65) Prior Publication Data

US 2015/0256043 A1 Sep. 10, 2015

(51) Int. Cl.
*H02K 5/16* (2006.01)
*H02K 7/08* (2006.01)
*F16C 35/07* (2006.01)
*H02K 15/00* (2006.01)
*F16C 35/077* (2006.01)

(52) U.S. Cl.
CPC ......... *H02K 15/0006* (2013.01); *F16C 35/077* (2013.01); *H02K 7/08* (2013.01); *H02K 2205/03* (2013.01); *Y10T 29/49012* (2015.01)

(58) Field of Classification Search
CPC .... F16C 35/077; F16C 35/07; F16C 35/067; F16B 21/183; F16B 7/042; H02K 5/167; H02K 5/1672; H02K 5/1675; H02K 5/1677; H02K 7/08; H02K 7/081; H02K 7/083; H02K 7/085; H02K 7/086; H02K 7/088; H02K 15/0006; H02K 2205/03; Y10T 29/49012

USPC ............................................ 403/DIG. 7, 319
See application file for complete search history.

(56) References Cited

U.S. PATENT DOCUMENTS

| 2,760,258 | A | * | 8/1956 | Rieger | F16B 3/04 |
| | | | | | 285/321 |
| 2,992,049 | A | * | 7/1961 | Siebert | F16C 35/02 |
| | | | | | 384/442 |
| 3,382,015 | A | * | 5/1968 | Steidl | B25B 27/20 |
| | | | | | 29/235 |

(Continued)

FOREIGN PATENT DOCUMENTS

| DE | 3146137 A1 | * | 6/1983 | ............. B65G 39/09 |
| DE | 19918296 A1 | * | 10/2000 | ............ F16C 19/466 |

(Continued)

*Primary Examiner* — Alan B Waits
(74) *Attorney, Agent, or Firm* — Law Offices of Mark L. Berrier (57) ABSTRACT

Systems and methods for preventing rotation of rotor bearings in electric motors which enable retrofitting of conventionally designed bearings to use spring-loaded keys instead of elastomeric T-rings to prevent rotation while allowing axial movement of the bearings within a stator bore. An elongated, curved spring arm is positioned in the nesting groove at the outer periphery of the bearing. One end of the spring may be secured to the bearing by positioning an S-shaped bend in the spring arm through a hole in the floor of the nesting groove. A key at the opposite end of the spring arm is urged radially outward by the spring arm. The key may be positioned in a slot in the outer portion of the bearing, and the spring arm may be retained in the groove by a retaining pin installed in the groove.

7 Claims, 5 Drawing Sheets

(56) References Cited

U.S. PATENT DOCUMENTS

| | | | | |
|---|---|---|---|---|
| 3,537,163 | A | * | 11/1970 | Steidl ................. B25B 27/20 29/441.1 |
| 3,752,514 | A | * | 8/1973 | Schoeps ............ B25B 23/0035 403/328 |
| 3,985,458 | A | * | 10/1976 | Snyder, Jr. ........... F16C 35/073 384/537 |
| 4,151,779 | A | * | 5/1979 | Timmer ................ F16B 21/18 384/903 |
| 4,343,581 | A | * | 8/1982 | Millheiser ............. F16B 21/18 411/353 |
| 4,511,191 | A | * | 4/1985 | Kitamura ............. F16C 35/067 384/536 |
| 4,521,708 | A | | 6/1985 | Vandevier |
| 4,540,386 | A | * | 9/1985 | Kampf ................. F16C 35/067 464/130 |
| 4,602,876 | A | * | 7/1986 | Miki .................... F16C 19/386 384/539 |
| 4,647,230 | A | * | 3/1987 | Friedrich ............. F16C 19/185 384/486 |
| 4,652,151 | A | * | 3/1987 | Siebert .................. F16C 35/02 384/434 |
| 4,854,747 | A | * | 8/1989 | Siebert ................. F16C 35/067 384/434 |
| 5,059,844 | A | * | 10/1991 | Anstine ................. F16B 2/243 29/596 |
| 5,128,573 | A | * | 7/1992 | Liu ....................... H02K 5/167 310/87 |
| 5,169,244 | A | * | 12/1992 | Siebert .................. F16C 35/02 384/276 |
| 5,785,433 | A | * | 7/1998 | Takahashi ............ F16C 35/067 384/255 |
| 5,927,867 | A | * | 7/1999 | Niebling ............. B60B 27/0005 384/448 |
| 6,106,156 | A | * | 8/2000 | Niebling ............... F16C 33/723 384/538 |
| 6,340,265 | B1 | * | 1/2002 | Suzuki ................... F16C 1/105 403/299 |
| 6,566,774 | B2 | | 5/2003 | Parmeter |
| 6,688,774 | B2 | * | 2/2004 | Kullin .................... E06B 9/174 29/898.07 |
| 6,705,763 | B2 | * | 3/2004 | Kamura ................. B60B 27/00 384/539 |
| 6,857,781 | B1 | * | 2/2005 | Sakamoto ............ F04D 29/061 384/114 |
| 6,956,310 | B1 | * | 10/2005 | Knox ..................... H02K 5/132 310/87 |
| 7,175,349 | B2 | * | 2/2007 | Sakamoto ................ B60B 3/16 384/544 |
| 7,374,345 | B2 | * | 5/2008 | Ilie ...................... F16C 33/7886 384/537 |
| 7,694,540 | B2 | | 4/2010 | Ishida |
| 7,967,512 | B2 | * | 6/2011 | Himeda ................ F16C 35/077 384/539 |
| 8,040,013 | B2 | * | 10/2011 | Parmeter ............... E21B 43/128 310/216.129 |
| 8,303,188 | B2 | * | 11/2012 | Otsuka ................... F16C 25/08 384/537 |
| 8,444,323 | B2 | * | 5/2013 | Bostwick ............. H02K 5/1732 384/585 |
| 8,567,042 | B2 | * | 10/2013 | Neuroth .................. F16C 17/04 29/428 |
| 8,740,467 | B2 | * | 6/2014 | Ravenna ............. B60B 27/0005 384/537 |
| 8,987,957 | B2 | * | 3/2015 | Knapp .................... H02K 7/08 310/87 |
| 2005/0105840 | A1 | * | 5/2005 | Muranaka .............. B60B 27/00 384/544 |
| 2011/0037332 | A1 | * | 2/2011 | Neuroth ................. F16C 17/04 310/87 |
| 2015/0224821 | A1 | * | 8/2015 | Nollenberger ...... B60B 27/0078 384/539 |

FOREIGN PATENT DOCUMENTS

| | | | | |
|---|---|---|---|---|
| DE | 102005026094 | * | 12/2006 | ............ F16C 19/184 |
| DE | 102006028294 | * | 12/2007 | ............ F16C 19/522 |

* cited by examiner

SYSTEMS AND METHODS FOR PREVENTING ROTATION OF ROTOR BEARINGS IN A STATOR

BACKGROUND

1. Field of the Invention

The invention relates generally to rotor bearings, and more particularly to systems and methods for preventing rotor bearings from rotating within a stator, where it is not necessary to precisely align the bearings for installation in the stator.

2. Related Art

Oil and natural gas are often produced by drilling wells into oil reservoirs and then pumping the oil and gas out of the reservoirs through the wells. If there is insufficient pressure in the well to force these fluids out of the well, it may be necessary to use an artificial lift system in order to extract the fluids from the reservoirs. A typical artificial lift system employs an electric submersible pump which is positioned in a producing zone of the well to pump the fluids out of the well.

An electric submersible pump system includes a pump and a motor which is coupled to the pump and drives the pump. The electric submersible pump system may also include seals, gauge packages and other components. Because they are designed to fit within the borehole of a well, electric submersible pump systems are typically less than ten inches wide, but may be tens of meters long. The motor of an electric submersible pump system may produce hundreds of horsepower.

The motor of the electric submersible pump system is typically an AC induction motor. The motor has a stator that is cylindrical with a coaxial bore. A rotor (or more than one rotor) is coaxially positioned within the bore of the stator. The rotor is coupled to a shaft so that rotation of the rotor turns the shaft. Bearings hold the shaft, hence the rotor, in position within the bore of the stator and allow the shaft and rotor to rotate smoothly within the bore.

Conventionally, each bearing is held in position within the stator bore by one or more T-rings. The T-rings are seated in a nesting groove around the periphery (the cylindrical outer surface) of the bearing. The T-rings extend radially outward from the bearing and contact the inner diameter of the stator bore. The T-rings thereby provide an interference fit between the bearing and the stator which serves to prevent the bearings from rotating in the stator bore, while also allowing the bearings to move axially within the stator bore to account for thermal expansion of the rotor stack. Such rotation of the bearings will cause unnecessary wear and/or damage to the bearings or the stator, which may lead to rapid motor failure.

There are, however, some disadvantages to using T-rings to hold the bearings within the stator. T-rings are commonly made from an elastomeric material such as EPDM, or ethylene propylene diene monomer. These types of elastomeric materials may not be able to withstand the high temperatures that are experienced by motors in downhole environments. In particular, in SAGD (steam assist, gravity drain) applications that are used to get oil out of tar sands, the downhole temperatures typically exceed 200 C. At these temperatures, EPDM loses its mechanical integrity and fails, so that the T-rings are no longer capable of properly securing the bearings and preventing them from rotating within the stator bore.

It would therefore be desirable to provide a mechanism for securing the bearings, and particularly for preventing the bearings from rotating in the stator bore while allowing axial bearing movement to account for thermal expansion, where the new mechanism does not fail in the high temperatures of downhole environments.

SUMMARY OF THE INVENTION

This disclosure is directed to systems and methods for preventing rotation of rotor bearings in electric motors which enable retrofitting of conventionally designed bearings to use spring-loaded keys instead of elastomeric T-rings to prevent rotation of the bearings within a stator bore. An elongated, curved spring arm is positioned in the nesting groove at the outer periphery of the bearing. One end of the spring may be secured to the bearing by positioning an S-shaped bend in the spring arm through a hole in the floor of the nesting groove. A key at the opposite end of the spring arm is urged radially outward by the spring arm. The key may be positioned in a slot in the outer portion of the bearing, and the spring arm may be retained in the groove by a retaining pin installed in the groove. The key moves radially as the spring arm is flexed. The key is pushed radially inward to a position that is within the outer diameter of the bearing. This allows the bearing to be inserted into the stator bore without the key having to be aligned with a keyway of the stator. After the bearing has been inserted into the stator bore (typically when the motor is operated), the bearing may rotate until the key at the end of the spring arm is aligned with the keyway in the stator bore. When the key is aligned with the keyway, the key is urged radially outward by the spring arm into the keyway, preventing further rotation of the bearing in the stator.

One embodiment comprises an apparatus having a rotor bearing with a spring/key mechanism installed in a nesting groove at the outer periphery of the bearing. The spring/key mechanism includes a curved spring arm that fits within the nesting groove. The spring arm has a first end that is secured to the bearing and resists circumferential movement of the spring arm with in the nesting groove. This may be accomplished, for example, by providing an S-shaped bend at the end of the spring arm and positioning the S-shaped bend through a hole that is formed in the floor of the groove. Alternatively, the spring arm may be long enough that it extends around more than half of the circumference of the groove and simply clips onto the bearing. A retaining pin may be provided to hold the spring arm in position within the groove. At the opposite end of the spring arm is a key. At least a portion of this end of the spring arm has a radius of curvature that is greater than that of the groove, so that the spring arm urges the key radially outward from the groove. This causes the key to move into engagement with a corresponding keyway of the stator when the bearing is positioned in the stator bore and rotates to move the key into alignment with the keyway.

The spring/key mechanism may be formed in various ways. In one embodiment, a round wire is formed into the curved arc of the spring arm. An S-shaped bend is made in one end of the wire for securing the spring arm to the bearing. A C-shaped bend is made in the other end of the wire to form the key. The spring/key mechanism may alternatively be made from flat wire. In one embodiment, an S-shaped bend is made in one end of the wire to be positioned in the hole in the floor of the nesting groove. The other end of the flat wire is bent upward to form the key. The key may be narrow enough to fit within the nesting groove, or it may be wider than the groove, in which case a slot is formed in the outer portion of the bearing to accommodate the key. The edges of the key may be rounded or chamfered to facilitate depression of the key into the groove and/or slot upon installation of the bearing into the stator bore.

An alternative embodiment comprises a method for retrofitting a rotor bearing with a mechanism that prevents rotation of the bearing within a stator. This method includes providing a conventionally designed bearing, possibly making minor modifications to the bearing, and installing a spring/key mechanism on the bearing. If the bearing initially has a T-ring installed in the nesting groove at the outer periphery of the bearing, the T-ring is removed. Depending upon the design of the spring/key mechanism, it may be necessary to form a slot in the outer portion of the bearing. Holes may be formed in the floor and/or walls of the groove to accept an S-shaped bend in the end of the spring arm, and to allow installation of a retaining pin. The spring arm of the spring/key mechanism is then installed by inserting the S-shaped bend through the hole in the floor of the groove and positioning the curved spring arm in the nesting groove. This deforms the spring arm so that a spring force will be applied to the key to urge it radially outward from the bearing. The spring arm may be retained in the groove by installing a retaining pin over it.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention. Further, the drawings may not be to scale, and may exaggerate one or more components in order to facilitate an understanding of the various features described herein.

DESCRIPTION OF EXEMPLARY EMBODIMENTS

Various embodiments of the invention are described below. It should be noted that these and any other embodiments described below are exemplary and are intended to be illustrative of the invention rather than limiting.

As described herein, various embodiments of the invention comprise systems and methods for preventing rotation of rotor bearings in electric motors. In one embodiment, an elongated spring arm is positioned near the outer diameter of the bearing so that it extends around at least a portion of the outer periphery of the bearing. There is a tab or key at one end of the spring arm. The key moves radially as the spring is flexed. As the key is pushed radially inward, the spring arm is compressed. This moves the key to a position within the outer diameter of the bearing, allowing the bearing to be inserted into the stator bore without the key having to be aligned with a keyway of the stator. After the bearing has been inserted into the stator bore, the bearing rotates until the key at the end of the spring arm is aligned with the keyway in the stator bore. When the key is aligned with the keyway, the key is urged radially outward by the spring arm into the keyway, preventing further rotation of the bearing in the stator.

The particular design of the spring arm and key may vary from one embodiment to another. The various embodiments may provide several advantages over the prior art. For instance, many bearing designs cannot be easily modified to accommodate conventional coil-spring-loaded keys, but very little modification of these designs is necessary to allow them to be retrofitted with the present spring-arm key mechanism. Additionally, the force provided by the circumferentially positioned spring arm to urge the key radially outward is more constant across the travel of the key and greater when the key is extended into the stator's keyway, when compared to a conventionally positioned coil spring. The spring arm therefore more effectively ensures that the key will engage the keyway.

Embodiments of the invention may be implemented, for example, in electric submersible pump systems. It should be noted that the invention is not limited to electric submersible pumps, but can be implemented in other types of motors as well. The electric submersible pump motor described herein is intended to be exemplary of the motors in which the invention can be used.

Figure 1:
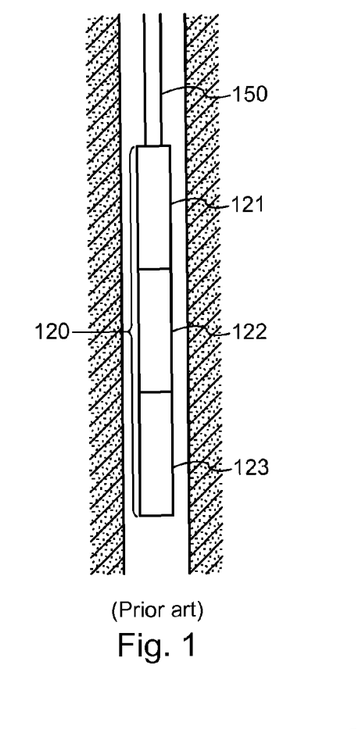
FIG. 1 is a diagram illustrating some of the primary components of an electric submersible pump system.

Referring to FIG. 1, a diagram illustrating the components of an electric submersible pump system in one embodiment is shown. In this embodiment, an electric submersible pump system is implemented in a well for producing oil, gas or other fluids. An electric submersible pump system 120 is coupled to the end of tubing string 150, and the electric submersible pump system and tubing string are lowered into the wellbore to position the pump in a producing portion of the well. A drive system (not shown) at the surface of the well provides power to the electric submersible pump system 120 to drive the system's motor.

Electric submersible pump system 120 includes a pump section 121, a seal section 122, and a motor section 123. Electric submersible pump system 120 may include various other components which will not be described in detail here because they are well known in the art and are not important to a discussion of the invention. Motor section 123 is coupled by a shaft through seal section 122 to pump section 121. Motor section 123 rotates the shaft, thereby driving pump section 121, which pumps the oil or other fluid through the tubing string 150 and out of the well.

Figure 2:
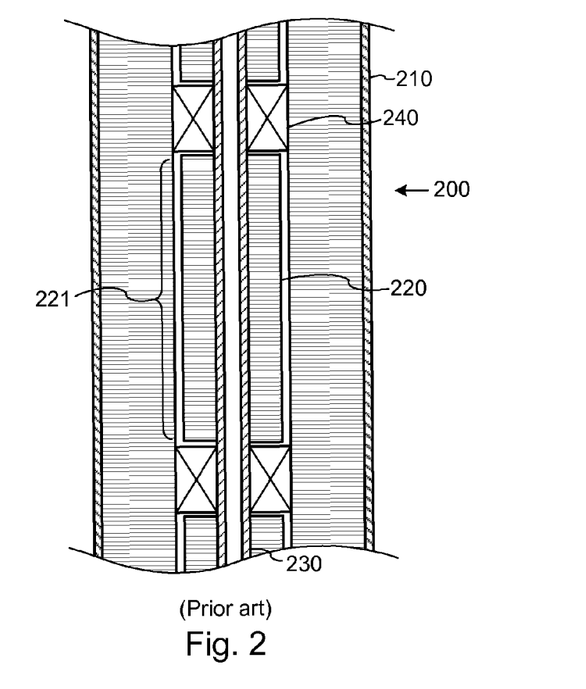
FIG. 2 is a diagram illustrating the structure of an exemplary motor suitable for use in an electric submersible pump system.

Referring to FIG. 2, a diagram illustrating the structure of an exemplary motor suitable for use in an electric submersible pump system is shown. As depicted in this figure, motor 200 has a stator 210 and a rotor 220. Stator 210 is generally cylindrical, with a coaxial bore that runs through it. Rotor 220 is coaxially positioned within the bore of stator 210. Rotor 220 is attached to a shaft 230 that is coaxial with the rotor and stator 210. In this example, rotor 220 includes multiple sections (e.g., 221), where bearings (e.g., 240) are positioned at the ends of each section. The bearings 240 support shaft 230, and consequently rotor 220, within the bore of stator 210 and allow the rotor and shaft 230 to rotate within the stator.

Figure 3:
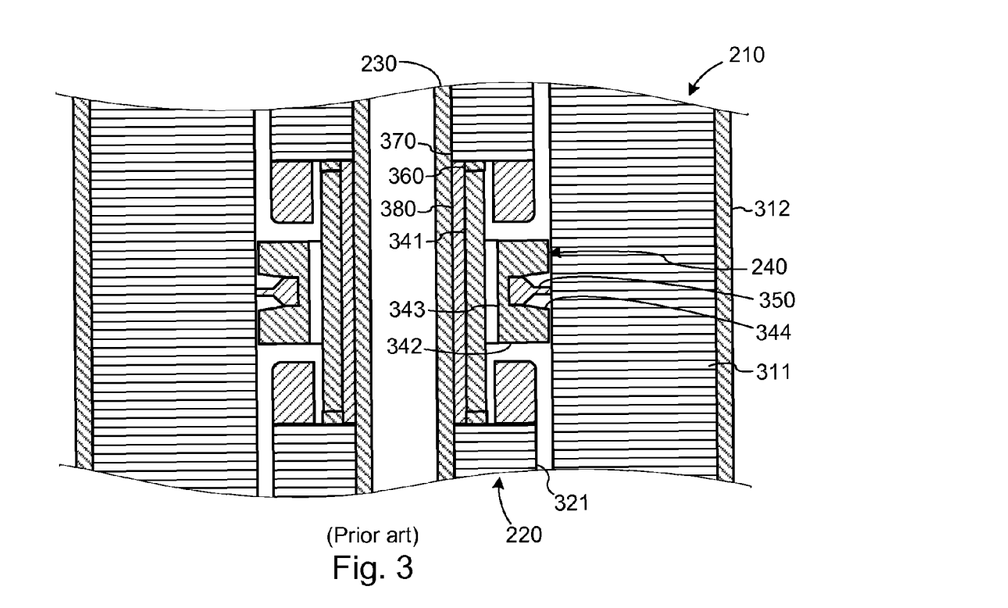
FIG. 3 is a more detailed diagram illustrating the structure of an exemplary motor including a rotor bearing.
Figure 4A:
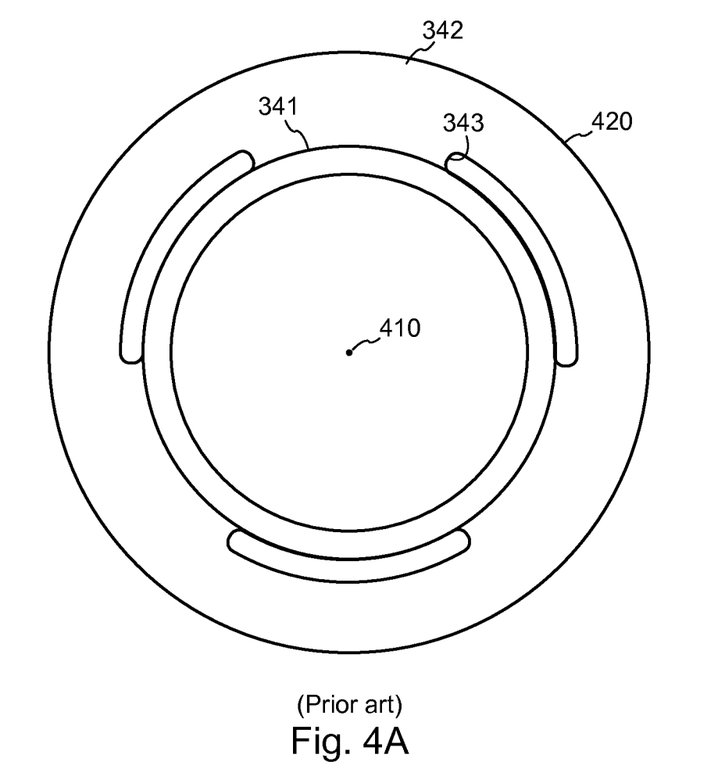
FIGS. 4A and 4B are diagrams illustrating an exemplary rotor bearing in accordance with the prior art.
Figure 4B:
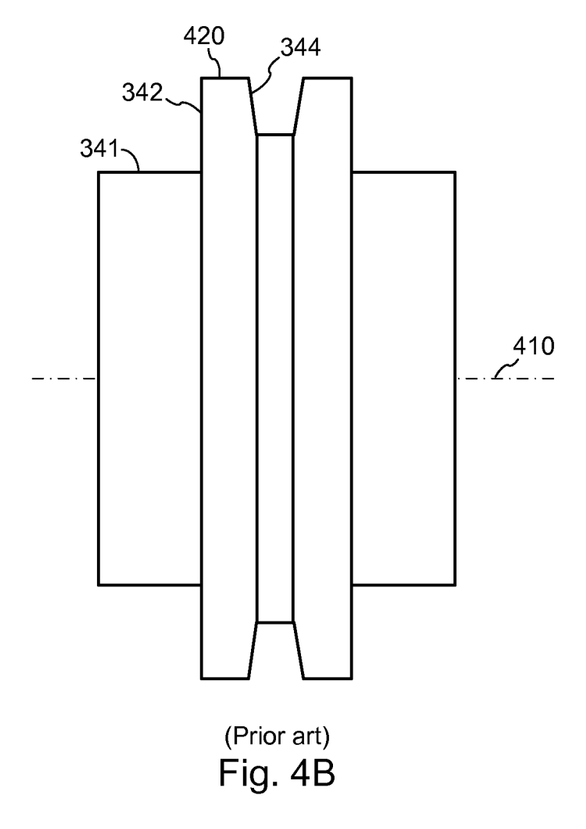

Referring to FIGS. 3 and 4, a pair of diagrams illustrating the structure of motor 200 and one of the bearings of the motor are shown in more detail. It can be seen in this figure that stator 210 is formed by stacking a set of thin, substantially identical plates or laminations (e.g., 311). The laminations 311 are generally annular in shape, so that when they are stacked together, they form a generally cylindrical shape, with a coaxial, cylindrical bore in the center. The diameter of the bore of the stator 210 may also be referred to as the inner diameter of the stator. The stacked laminations 311 are pressed into a housing 312 to form the stator assembly 210. It should be noted that the laminations 311 need not be exactly identical. Similarly, the laminations 311 need not be perfectly annular. For example, in some embodiments, the laminations form a key or keyway that extends axially and mates with a corresponding structure of housing 312 to prevent the stacked laminations from rotating within the housing. Each of laminations 311 also includes a notch on its inner diameter. This notch enables the alignment of the lamination with the other laminations in the stator and also forms a part of the keyway that will be engaged by the spring-loaded key of the bearing.

The construction of rotor 220 is similar to that of stator 210, in that the rotor sections are formed by stacking corresponding sets of laminations (e.g., 321). The laminations 321 are again essentially annular, having an outer diameter that is slightly less than the inner diameter of stator 220, and an inner diameter that is substantially equal to the outer diameter of shaft 230. Each set of laminations 321 is stacked and shaft 230 is positioned through the bore formed through the stacked rotor laminations. The shaft 230 and laminations 321 may be keyed to prevent the laminations from rotating with respect to the shaft.

Rotor 220 is held in position within stator 210 by the rotor bearings (e.g., 240). As noted above, there are multiple bearings, each of which is positioned between (or at an ends of) the rotor sections. Thrust washers (e.g., 360) are positioned between bearing 240 and the end plates (e.g., 370) of the rotor sections. A sleeve 380 is secured to shaft 230. Bearing 240 has an inner portion 341 that supports sleeve 380 and allows the sleeve to rotate within the bearing. Inner portion 341 may also be referred to as the neck of the bearing. Bearing 240 has an outer portion 342 that extends radially outward toward the stator. Passageways (e.g., 343) through outer portion 342 allow oil to flow through the outer portion, facilitating lubrication and cooling of the motor components.

Bearing 240 is a conventional bearing that uses a T-ring (350) to maintain the position of the bearing within the stator bore. T-ring 350 is seated in a nesting groove 344 in the periphery of the outer portion (342) of the bearing. The outer diameter of bearing 240 is slightly less than the inner diameter of the stator bore, so T-ring 350 extends radially outward from the outer diameter of the bearing in order to contact the inner diameter of the stator. T-ring 350 is intended to provide an interference fit between bearing 240 and stator 210 to hold the bearing in place within the stator bore and prevent the bearing from rotating within the stator bore. The interference fit allows axial movement of the bearing within the stator bore to accommodate movement of the stacked laminations of the rotor caused by thermal expansion during operation of the motor.

Referring to FIGS. 4A and 4B, bearing 240 is shown apart from the other components of the motor. FIG. 4A is a view of the bearing along its axis, while FIG. 4B is a side view of the bearing. These figures explicitly depict the axis (410) of the bearing, as well as the outer diameter (420) of the bearing. Outer diameter 420 may also be referred to herein as the outer periphery of the bearing.

For purposes of this disclosure, the term "radially" refers to directions that are substantially (and not necessarily exactly) perpendicular to the axis of the bearing. Thus, "radially inward" means a direction toward the axis, while "radially outward" means a direction away from the axis. The term "circumferential" refers to directions (or items) having a substantially constant distance from the axis. For example, T-ring 350 extends circumferentially around bearing 240.

Figure 5A:
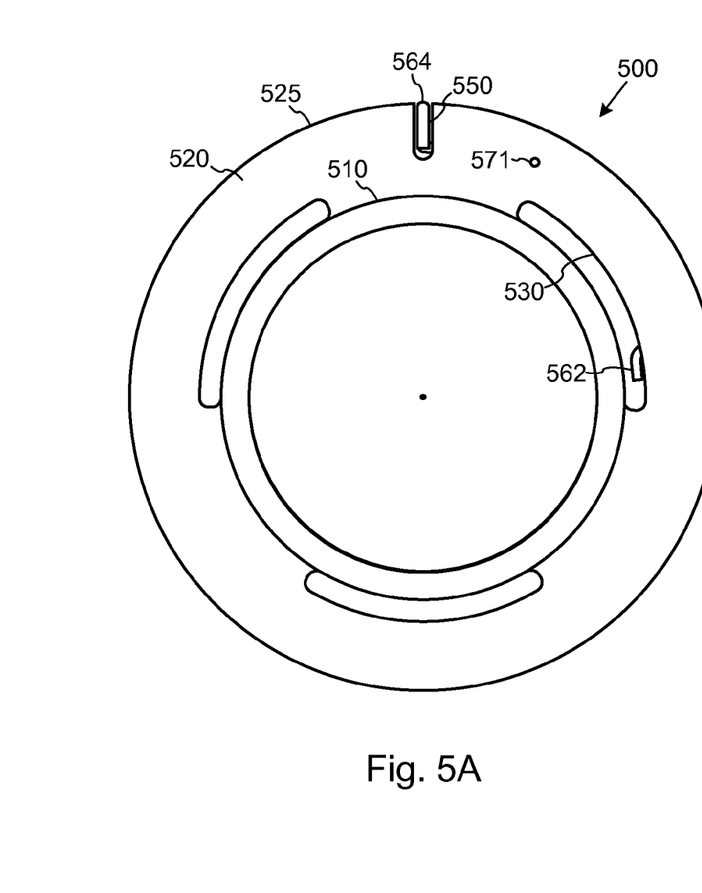
FIGS. 5A and 5B are diagrams illustrating an exemplary rotor bearing having a spring-loaded key installed thereon in accordance with one embodiment.
Figure 5B:
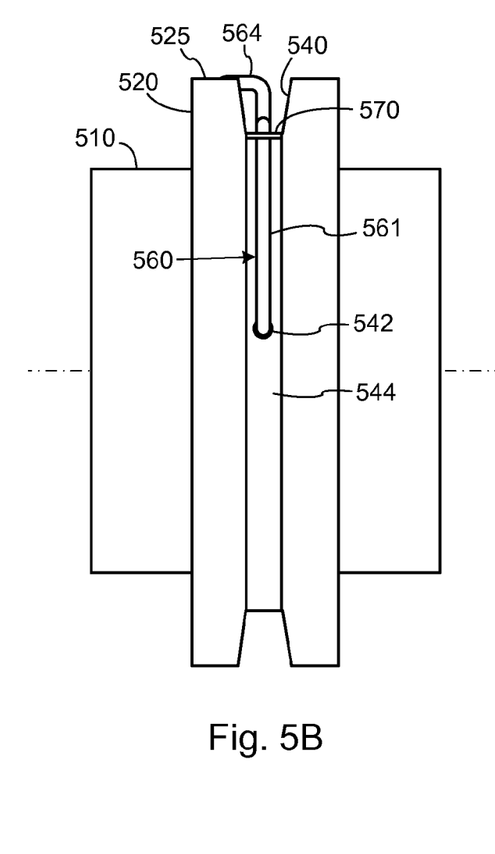

FIGS. 5A and 5B illustrate a bearing that has a spring-loaded key incorporated therein in accordance with one embodiment. In this embodiment, the bearing shown in FIGS. 4A and 4B has been modified to incorporate a spring loaded key to illustrate the manner in which a conventional bearing can be easily retrofitted with the present spring-loaded key mechanism.

Referring to FIGS. 5A and 5B, bearing 500 has a cylindrical inner portion 510 and a cylindrical outer portion 520, with a bore therethrough. A plurality of passageways (e.g., 530) are provided through outer portion 520 to allow oil to circulate through the bearing. A nesting groove 540 is formed in the outer periphery 525 of the bearing. These features are common to the conventional bearing shown in FIGS. 4A and 4B.

Figure 6:
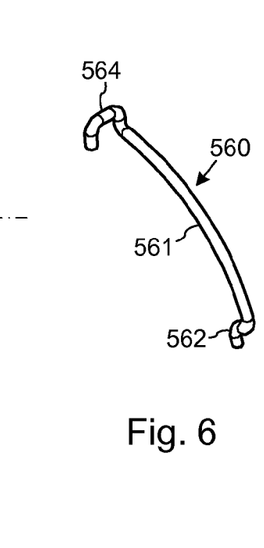
FIG. 6 is a diagram illustrating a spring/key member in accordance with one embodiment.

Bearing 500, however, includes several features that are not found in the conventional bearing. For example, rather than having a T-ring positioned in groove 540, bearing 500 has a spring/key member 560 that is installed in the groove. Spring/key member 560 has a curved body, or spring arm 561 that extends circumferentially around a portion of the groove. Spring arm 561 forms an arc of approximately 80 degrees, but could be between about 30 to 360 degrees in alternative embodiments. At a lower end of spring body 561 is an S-shaped bend 562. At the upper end of body 561 is a C-shaped key 564. The diameter of key 564 must be sized to fit in the keyway. A hole 542 is formed between the bottom of groove 540 and passageway 530. S-shaped bend 562 is positioned in hole 542 to secure the lower end of spring/key member 560. C-shaped key 564 is positioned in slot 550. Spring/key member 560 is shown apart from the bearing in FIG. 6.

Spring/key member 560 is preferably made of a non-magnetic metal, such as 203/304 stainless steel, 17-7 stainless steel, or any grade of Inconel, Monel, or Elgiloy. Spring body 561 has a radius of curvature that is greater than the radius of curvature of the bottom or floor 544 of groove 540. Consequently, when S-shaped bend 562 is secured in hole 542 and C-shaped key 564 is positioned in slot 550, the C-shaped key is urged radially outward, away from the bearing. In one embodiment, a retaining pin 570 may be positioned over spring/key member 560 to retain the spring/key member in groove 540. Retaining pin 570 is inserted into hole 571, which extends above and across groove 540 and into the opposing side of outer portion 520. In an alternative embodiment, as key 564 is urged outward, it may actually move at an angle with respect to slot 550, so that the key contacts the side of the slot. This may limit the outward movement of the key and thereby retain it in the slot. In this case, there is no need for retaining pin 570.

Figure 7A:
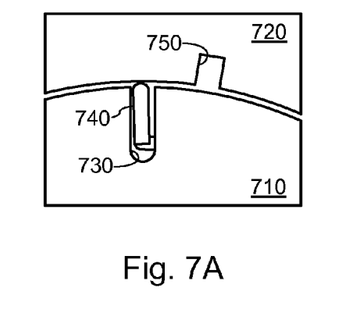
FIGS. 7A and 7B are a pair of diagrams illustrating the operation of the spring/key member in one embodiment.
Figure 7B:
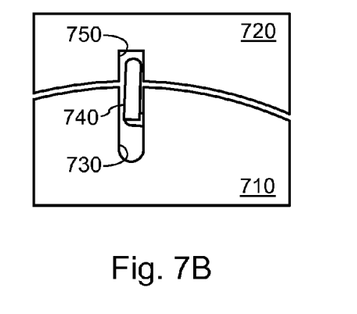

Referring to FIGS. 7A and 7B, a pair of diagrams illustrating the operation of the spring/key member is shown. These figures depict a bearing having a spring/key member as described in connection with FIGS. 5-6, where the bearing has been positioned within a stator bore. Each of FIGS. 7A and 7B shows the outer portion 710 of the bearing and the bore of stator 720. Outer portion 710 of the bearing has a slot 730 in which key 740 is positioned. FIG. 7A shows key 740 in a retracted position in slot 730 of the bearing, while FIG. 7B shows the key in an extended position in which it engages keyway 750 of the stator.

When the bearing is installed in the stator, key 740 is simply pushed down into slot 730 so that it does not substantially extend beyond the outer diameter of the bearing, and the bearing is inserted into the stator bore without regard for the circumferential orientation of the bearing with respect to keyway 750. In most instances, slot 730 and key 740 will not be aligned with keyway 750, so key 740 will initially remain in its retracted position in slot 730, as shown in FIG. 7A. After the motor is assembled and it begins operating, rotation of the rotor within the stator will normally cause the bearing to rotate to some degree. When the rotation of the bearing brings key 740 into alignment with keyway 750, the spring arm will cause key 740 to move radially outward into the keyway. When key 740 engages keyway 750 in this manner, the bearing is prevented from rotating any further in the stator. The diameter of the key 740 must be small enough relative to the groove to allow axial movement of the bearing in the stator, but large enough to transfer sufficient rotational force to the bearing to prevent bearing rotation.

As shown in FIGS. 5A and 5B, a portion of C-shaped key 564 is positioned within slot 550. This configuration is advantageous in that the rotating force is immediately transferred from the keyway of the stator through the key to the outer portion of the bearing. In alternative embodiments, it is not necessary for the key to be positioned in a slot in the bearing. The key may instead sit entirely within the groove around the periphery of the bearing. In such a configuration, the rotating force would be transferred from the stator keyway, down the length of the spring arm to the S-shaped bend that is secured to the bearing. Similarly, it is not necessary in all embodiments to use the mechanism of an S-shaped bend in a hole in the bearing to hold the spring arm in position and prevent it from rotating (moving circumferentially with respect to the bearing). If the spring arm is long enough (e.g., if the spring arm extends 270 degrees around the groove), the friction between the spring arm and the bottom of the groove may be sufficient to hold the spring arm in position on the bearing and consequently to prevent the bearing from rotating within the stator.

Figure 8A:
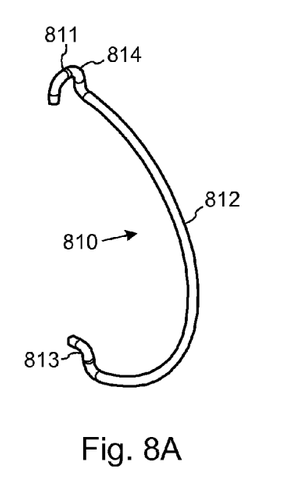
FIGS. 8A-8C are diagrams illustrating spring/key members in accordance with several alternative embodiments.
Figure 8B:
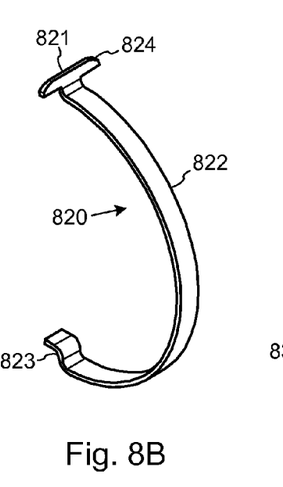
Figure 8C:
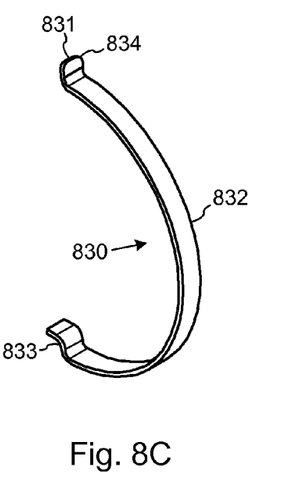

The spring/key member described above in connection with FIGS. 5-6 is an example of the many variations that are possible. Several alternative embodiments of the spring/key member are shown in FIGS. 8A-8C. FIG. 8A shows an embodiment in which spring/key member 810 is formed from round wire, similar to spring/key member 560. The C-shaped key (811) and S-shaped bend (813) of spring/key member 810 are the same as the corresponding components of member 560, but the body (812) of spring/key member 810 is longer, and extends around a greater portion of the groove in the periphery of the bearing (forming an arc of approximately 170 degrees, instead of the approximately 80 degree arc of spring/key member 560).

FIGS. 8B and 8C depict embodiments of the spring/key member that are formed with flat wire, which has a substantially constant thickness and width, instead of round wire. In the embodiment of FIG. 8B, a key 821 is formed at the upper end of spring body 822, and an S-shaped bend 823 is formed at the lower end. The width of body 822 is small enough the body will be seated on the floor of the groove. Key 821, however, is wider than the body, so that it will extend into the slot that is formed in the outer portion of the bearing. As explained above, this will result in the transfer of the rotating force immediately from the keyway of the stator through the key to the outer portion of the bearing.

The embodiment of FIG. 8C is very similar to that of FIG. 8B, having a key 321 at the upper end of spring body 832, and an S-shaped bend 833 at the lower end. The embodiment of FIG. 8C, however, does not have a widened key. Key 831 is instead the same width as spring body 832. Key 831 is narrow enough that it fits entirely within the nesting groove of the bearing. One of the advantages of this configuration is that it is not necessary to form a slot in the outer portion of the bearing. Additionally, the spring/key member itself uses less material and may be less costly to manufacture than the design with the wider key.

It can be seen that, in each of the embodiments shown in FIGS. 6 and 8A-8C, the key has rounded or chamfered edges (e.g., 814, 824, 834) in order to facilitate installation into, and removal from, the motor bore. The rounded/chamfered edges prevent the edge of the key from catching on the edge of the stator bore and keep the key pushed down into the nesting groove as the bearing slides into the stator bore. The chamfered edge also allows for removal of the bearing from the stator, where the expanded spring transitions from the keyway into a smaller diameter exit bore. Lack of a chamfered edge would effectively create a snap lock where the key would deadhead against a smaller diameter lead-in bore to the stator, thus preventing the bearing, and thus potentially the entire rotor stack, from being pulled out of the stator.

Although each of the embodiments shown in FIGS. 6 and 8A-8C includes an S-shaped bend to secure the lower end of the spring/key member to the bearing (e.g., by positioning it in hole 542), alternative embodiments may keep the device in position using alternative means. For instance, an L-shaped bend may be used instead of an S-shaped bend. The S-shaped or L-shaped bend could also be positioned in a hole through the side of the groove, rather than the floor of the groove, to secure the end of the spring arm.

In other embodiments, the spring arm may be lengthened so that the spring arm wraps around the floor of the groove and holds the spring/key member on the bearing. The spring arm may, for example, form an arc of 270 degrees so that it clips onto the bearing. It may therefore be unnecessary to provide any means to secure the lower end of the spring arm to the bearing other than the spring arm itself. In this embodiment, the portion of the spring arm that provides the friction fit on the bearing may have a radius of curvature that is less than that of the floor of the groove, while a portion adjacent to the key may have a greater radius of curvature so that it can provide a spring force to urge the key outward from the bearing.

Figure 9A:
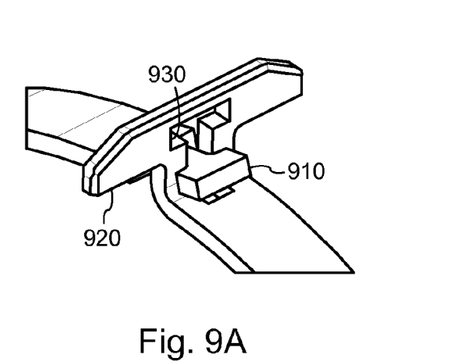
FIGS. 9A-9B are diagrams illustrating interlocking keys and spring arm ends in accordance with two alternative embodiments.
Figure 9B:
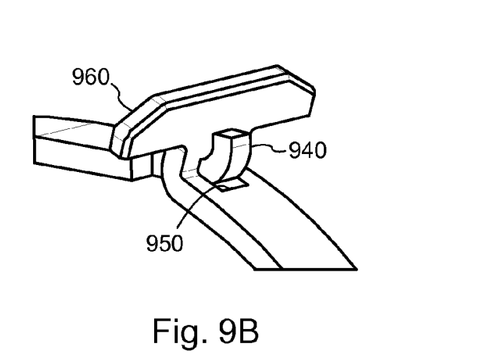

In another embodiment, the spring arm may wrap entirely around the bearing so that one end of the spring arm hooks onto the other end. In this embodiment, the spring arm may be considered to form an arc of 360 degrees. Examples of this embodiment are depicted in FIGS. 9A-9B. In FIG. 9A, a small T (910) is formed in the end of the spring arm opposite the key (920). A T-shaped hole (930) through key 920 is provided so that T 910 can be inserted through the widened upper part of hole 930. When T 910 is moved downward into the narrower part of hole 930 (as shown in the figure), the T is locked against key 920. In the example of FIG. 9A, a simpler 90-degree bend (940) is formed at the end of the spring arm. Bend 940 is inserted through a hole (950) that is formed in the spring arm just below key 960, holding the two ends of the spring arm together.

There may be other variations in other alternative embodiments. For instance, in one embodiment, the stator may include more than one keyway that can be engaged by the spring-loaded key. In another embodiment, multiple spring-loaded keys may be installed on a bearing. Some embodiments comprise the spring-loaded key mechanism alone, while other embodiments may include this mechanism installed on a bearing, and yet other embodiments comprise a motor having one or more bearings with the spring-loaded key mechanism.

Another alternative embodiment comprises a method for retrofitting a rotor bearing. In this method, a bearing that is designed to be used with a conventional T-ring is retrofitted with a spring/key member as described above. The retrofit requires little, if any, modification of the bearing and therefore reduces the cost of the procedure as compared to conventional retrofit procedures.

In one embodiment, a bearing having a nesting groove in the outer periphery of the bearing is provided. The groove is designed to accommodate a T-ring. If the T-ring is installed on the bearing, the T-ring is removed. A slot is then machined into the outer portion of the bearing. The slot extends across the width (axially) of the outer portion of the bearing. A hole is also machined into the floor of the groove. In this embodiment, the hole extends through the floor of the groove to an oil passageway as shown in FIGS. 5A-5B. The hole is separated from the slot by the length of the spring/key member to be installed.

A spring/key member that includes a spring arm and a key is then installed on the bearing. The spring arm has the key on one end and an S-shaped bend on the other end. The S-shaped bend is inserted in the hole in the floor of the groove, and the spring arm is positioned in the groove with the key in the slot. If needed, a retaining pin is inserted in the slot over the spring arm to retain the spring arm in the groove.

After the spring/key member has been installed on the bearing, the bearing may be installed in the stator bore. In one embodiment, the bearing is assembled with the various components of the rotor, and this assembly is inserted into the bore of the stator. When the rotor assembly is inserted into the stator bore, the key is pushed radially inward, into the slot (and groove). Typically, the laminations of the stator are recessed into the housing of the stator so that the key cannot be held down manually. The chamfered edges of the key allow the key to be pushed inward by contact with the stator laminations. After the rotor assembly has been fully inserted into the stator bore, assembly of the motor is completed.

The key may remain depressed into the slot and/or groove after assembly of the motor is complete. When the motor is operated, the bearing will tend to rotate until the key of the spring/key assembly is aligned with the keyway in the stator bore. When the key is aligned with the keyway, the spring force that the mechanism applies to the key will cause the key to move radially outward from the bearing into the keyway. When the key is engaged with the keyway, the spring/key member will prevent the bearing from rotating any further.

It should be noted that there may be many alternative embodiments. For example, embodiments may include rotor bearings, motors (e.g., electric submersible pump motors) that utilize bearings as described above, methods of manufacturing or using bearings having the described features, and so on. Alternative embodiments may also include many variations of the features described above. For instance, there may be one or multiple spring/key members, and so on. Still other variations may be apparent to those of skill in the art upon reading this disclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed herein.

What is claimed is:

1. An apparatus comprising:
   a rotor bearing having a nesting groove in an outer periphery of the rotor bearing in a circumferential direction, wherein the nesting groove extends in an arc of at least 30 degrees around an axis of the bearing;
   a curved spring arm positioned in the nesting groove, wherein the spring arm extends in an arc of at least 30 degrees around an axis of the bearing,
      wherein the spring arm has a first end that is secured to the bearing and resists circumferential movement of the spring arm with respect to the bearing,
      wherein the spring arm has a second end opposite the first end,
      wherein the spring arm has a key connected to the second end, and
      wherein when the key is positioned within an outer diameter of the bearing, the spring arm is deformed against a floor of the nesting groove and thereby provides a spring force that urges the key radially outward from the bearing; and
   a stator, wherein the stator has a bore therethrough and wherein the bore has a keyway therein, wherein the rotor bearing is positioned within the bore and the key is urged by the spring arm into contact with the stator, wherein when the key is aligned with the keyway, the key is urged into the keyway by the spring arm.

2. An apparatus comprising:
   a rotor bearing having a nesting groove in an outer periphery of the rotor bearing in a circumferential direction, wherein the nesting groove extends in an arc of at least 30 degrees around an axis of the bearing;

a curved spring arm positioned in the nesting groove,
wherein the spring arm extends in an arc of at least 30 degrees around an axis of the bearing,
wherein the spring arm has a first end that is secured to the bearing and resists circumferential movement of the spring arm with respect to the bearing,
wherein the spring arm has a second end opposite the first end,
wherein the spring arm has a key connected to the second end, and
wherein when the key is positioned within an outer diameter of the bearing, the spring arm is deformed against a floor of the nesting groove and thereby provides a spring force that urges the key radially outward from the bearing; and
a slot in an outer portion of the rotor bearing, wherein the slot is connected to the nesting groove and extends axially across the nesting groove, wherein at least a portion of the key is positioned within the slot.

3. The apparatus of claim 2, wherein the key is wider than the nesting groove, wherein at least a portion of the key is positioned in the slot.

4. An apparatus comprising:
a rotor bearing having a nesting groove in an outer periphery of the rotor bearing in a circumferential direction, wherein the nesting groove extends in an arc of at least 30 degrees around an axis of the bearing;
a curved spring arm positioned in the nesting groove,
wherein the spring arm extends in an arc of at least 30 degrees around an axis of the bearing,
wherein the spring arm has a first end that is secured to the bearing and resists circumferential movement of the spring arm with respect to the bearing,
wherein the spring arm has a second end opposite the first end,
wherein the spring arm has a key connected to the second end, and
wherein when the key is positioned within an outer diameter of the bearing, the spring arm is deformed against a floor of the nesting groove and thereby provides a spring force that urges the key radially outward from the bearing; and
wherein the key has one or more chamfered edges.

5. An apparatus comprising:
a rotor bearing having a nesting groove in an outer periphery of the rotor bearing in a circumferential direction, wherein the nesting groove extends in an arc of at least 30 degrees around an axis of the bearing;
a curved spring arm positioned in the nesting groove,
wherein the spring arm extends in an arc of at least 30 degrees around an axis of the bearing,
wherein the spring arm has a first end that is secured to the bearing and resists circumferential movement of the spring arm with respect to the bearing,
wherein the spring arm has a second end opposite the first end,
wherein the spring arm has a key connected to the second end, and
wherein when the key is positioned within an outer diameter of the bearing, the spring arm is deformed against a floor of the nesting groove and thereby provides a spring force that urges the key radially outward from the bearing
wherein the spring arm has an S-shaped bend in the first end; and
wherein the apparatus has a hole in one of: the floor of the nesting groove; and a wall of the nesting groove, wherein the S-shaped bend in the first end extends through the hole and thereby secures the first end to the bearing.

6. An apparatus comprising:
a rotor bearing having a nesting groove in an outer periphery of the rotor bearing in a circumferential direction, wherein the nesting groove extends in an arc of at least 30 degrees around an axis of the bearing;
a curved spring arm positioned in the nesting groove,
wherein the spring arm extends in an arc of at least 30 degrees around an axis of the bearing,
wherein the spring arm has a first end that is secured to the bearing and resists circumferential movement of the spring arm with respect to the bearing,
wherein the spring arm has a second end opposite the first end,
wherein the spring arm has a key connected to the second end, and
wherein when the key is positioned within an outer diameter of the bearing, the spring arm is deformed against a floor of the nesting groove and thereby provides a spring force that urges the key radially outward from the bearing,
wherein the spring arm comprises a first portion adjacent to the second end of the spring arm having a second radius that is greater than the radius of the floor of the groove, and wherein the spring arm further comprises a second, friction-fit portion adjacent to the first end of the spring arm having a first radius that is less than a radius of the floor of the groove.

7. An apparatus comprising:
a rotor bearing having a nesting groove in an outer periphery of the rotor bearing;
a spring arm positioned in the nesting groove,
wherein the spring arm has a first end that is secured to the bearing and resists circumferential movement of the spring arm with respect to the bearing,
wherein the spring arm has a second end opposite the first end,
wherein the spring arm has a key connected to the second end, and
wherein when the key is positioned within an outer diameter of the bearing, the spring arm is deformed and thereby provides a spring force that urges the key radially outward from the bearing; and
a retaining pin positioned in the nesting groove, radially outward from the spring arm, wherein the retaining pin holds the spring arm in the nesting groove; and
a stator, wherein the stator has a bore therethrough and wherein the bore has a keyway therein, wherein the rotor bearing is positioned within the bore and the key is urged by the spring arm into contact with the stator, wherein when the key is aligned with the keyway, the key is urged into the keyway by the spring arm.

* * * * *